United States Patent [19]

Harradine et al.

[11] Patent Number: 5,543,861
[45] Date of Patent: Aug. 6, 1996

[54] MULTICHANNEL VIDEO DATA STORAGE INCLUDING BUFFERS FOR READING DATA AT FAST RATES AND SUPPLYING DATA AT SLOWER RATES

[75] Inventors: Vincent C. Harradine, Chineham; Howard J. Teece, South View; Michael J. Ludgate, Kings Furlong; Rajan Bhandari, Chineham; Gavin A. Walker, Petersfield, all of United Kingdom

[73] Assignees: Sony Corporation, Tokyo, Japan; Sony United Kingdom Limited, Weybridge, England

[21] Appl. No.: 401,280

[22] Filed: Mar. 9, 1995

[30] Foreign Application Priority Data

Mar. 18, 1994 [GB] United Kingdom .................... 9405319

[51] Int. Cl.⁶ ...................................................... H04N 9/64
[52] U.S. Cl. ............................ 348/718; 345/201; 360/9.1
[58] Field of Search ..................................... 348/713–715; 358/335, 342, 310; 360/9.1, 33.1; 345/201; H04N 7/64

[56] References Cited

U.S. PATENT DOCUMENTS

| 4,842,750 | 5/1988 | Ko et al. | 345/201 |
|---|---|---|---|
| 5,006,936 | 4/1991 | Hooks, Jr. | 360/9.1 |

Primary Examiner—Victor R. Kostak
Attorney, Agent, or Firm—William S. Frommer; Alvin Sinderbrand

[57] ABSTRACT

A storage mechanism utilizing a single data recorder from which multiple channels of compressed video data may be simultaneously accessed. The data access to and from the data recorder via a single data access path takes place at a higher data rate ($f_1$, $f_2$) than the data rate ($f_3$, $f_4$) at which that compressed data needs to be decoded to support a video signal. A video router is used to direct the reproduced data stored within two data channel buffers to respective JPEG decoders where they are decompressed into a signal suitable for driving two digital monitors. In operation, a segment of compressed video data for one channel is recovered from the data recorder and stored within one of the buffers from which it is continuously read at a lower data rate ($f_3$, $f_4$). The data recorder then cues to another part of the medium from which data for the second channel is reproduced and stored within another buffer. The process is then repeated.

15 Claims, 3 Drawing Sheets

MULTICHANNEL VIDEO DATA STORAGE INCLUDING BUFFERS FOR READING DATA AT FAST RATES AND SUPPLYING DATA AT SLOWER RATES

BACKGROUND OF THE INVENTION

1. Field of the Invention

This invention relates to the field of storing video data. More particularly, this invention relates to the storage of multiple channels of video data.

2. Description of the Prior Art

There are many known mechanisms for storing video data. Video data can be stored in analogue form on conventional domestic VHS video tape. In more sophisticated systems video data may be stored digitally on magnetic tape utilizing, for example, the D-1 or D-2 formats. A characteristic of such systems is that comparatively large volumes of data are needed to support a good quality video image. This places stringent data handling requirements upon the rate at which the storage devices must be able to record and reproduce data.

A trend within the use of video storage systems is the desire to make available increased numbers of video channels. The increased number of channels may be needed to accommodate an increased number of broadcast channel providers, to deal with associated data, such as subtitles or high quality audio, or to allow for systems such as near video on demand (i.e. multiple channels show the same programme with starting times spaced a few minutes apart so as to allow increased flexibility as to the time at which a viewer must commence watching the program). The provision of increased numbers of channels is expensive in terms of the necessary hardware and increases operational complexity.

SUMMARY OF THE INVENTION

Viewed from one aspect, this invention provides apparatus for storing video data, said apparatus comprising:

(i) storage means for storing video data as addressable data segments accessible via a single data access channel;

(ii) address generating means for generating addresses of data segments to be accessed within said storage means;

(iii) a first data channel buffer for exchanging data segments with said storage means via said single data access channel at a first data rate $f_1$ with an average first duty ratio $dr_1$ under control of said address generating means;

(iv) a second data channel buffer for exchanging data segments with said storage means via said single data access channel at a second data rate $f_2$ with an average second duty ratio $dr_2$ under control of said address generating means;

(v) first data channel video signal converting means for exchanging a first video display signal corresponding to said data segments with said first data channel buffer at a third data rate $f_3$; and (vi) second data channel video signal converting means for exchanging a second video display signal corresponding to said data segments with said second data channel buffer at a fourth data rate $f_4$; wherein (vii) $(f_1 \times dr_1) \geq f_3$, $(f_2 \times dr_2) \geq f_4$ and $(dr_1 + dr_2) \leq 1$ such that said first data channel buffer and said second data channel buffer can sequentially exchange data segments with said storage means via said single data access channel whilst providing continuous data exchange with said first video signal and said second video signal.

The invention exploits the high speed data handling capability of the storage means to simultaneously provide at least two video channels from a single storage means. In order to achieve this, the first data channel buffer and the second data channel buffer are used to read in data from the storage means at a high data rate and continuously supply data for the generation of the respective video channels at a slower data rate. Providing that the relationships between the respective data rates and average duty ratios for the reading via the single data access channel as given above are met, then it is possible to continuously provide more than one video channel from a single storage device. In this way, hardware expense may be reduced. Furthermore, in applications such as near video on demand where a time shifted version of the same program is shown on different channels, a single copy of the program material is all that is required with the storage means shuttling between the currently playing time shifted portions as required. Another example would be a system providing a common program to differing channels with different sets of advertisements being shown on each channel during commercial breaks. The system allows a single storage device to provide the common programme and the differing sets of advertisements.

It will be appreciated that the invention is not limited to the provision of only two channels from the single storage means. Thus, in preferred embodiments there is also provided at least one further data channel buffer for exchanging data segments with said storage means.

This further data channel buffer may be used to handle data segments that correspond to data other than video data. For example, this further data channel may be dedicated to high quality audio signals, subtitle data or even completely unrelated data such as computer data.

It will be appreciated that the invention supports more than one data channel simultaneously from a single storage means. The data exchanges that may be performed on each channel can be either for data recording or data reproduction. Thus, both channels may be involved in data reproduction, one channel may be involved in data recording whilst the other is involved in data reproduction or both channels may be involved in data recording.

In order to ease the data handling requirements placed upon the storage means, it is preferred that said data segments corresponding to said first video signal comprise compressed video data and said first data channel video signal converting means comprises a first data decompressor for decompressing said compressed video data to form said first video signal at said third data rate $f_3$, said third data rate $f_3$ being fixed to yield a constant video field/frame rate.

Utilizing compressed video data in the storage means allows a reduction in the rate of data transfer that need be provided from the storage means to the data channel buffer to support the multiple video channels.

Whilst various compression techniques, such as MPEG and the like, may be used, a particularly preferred compression technique is one in which said compressed video data comprises JPEG compressed video data and said first data decompressor comprises a JPEG decoder.

The JPEG (Joint Photographic Experts Group) standard is a still image compression standard using orthogonal transformation and variable length coding techniques.

The same compression techniques can be used upon the second video signal channel.

As will be appreciated, the storage means has a single data access channel but may contain multiple storage media, e.g. a magnetic disc array. However, in preferred embodiments said storage means comprises a single storage media. The use of a single storage media simplifies the use of the system since an operator need not be concerned with which particular combination of storage media are loaded into the device to provide the material for the differing channels.

As previously mentioned, these storage media could take a number of forms. Particularly preferred forms comprise a magnetic tape, a magnetic disc, an optical disc and solid state memory.

A particularly convenient way in which the invention may be embodied utilizing relatively inexpensive hardware and without unduly complex interconnection cabling is one in which said storage means, said first data channel buffer, said second data channel buffer, said first data channel video signal converting means and said second data channel video signal converting means are interconnected by serial data links via a digital router.

Viewed from another aspect this invention provides a method of storing video data, said method comprising the steps of:

(i) storing video data as addressable data segments accessible via a single data access channel of a storage means;

(ii) generating addresses of data segments to be accessed within said storage means with address generating means;

(iii) exchanging data segments between a first data channel buffer and said storage means via said single data access channel at a first data rate $f_1$ with an average first duty ratio $dr_1$ under control of said address generating means;

(iv) exchanging data segments between a second data channel buffer and said storage means via said single data access channel at a second data rate $f_2$ with an average second duty ratio $dr_2$ under control of said address generating means;

(v) exchanging a first video display signal corresponding to said data segments with said first data channel buffer via first data channel video signal converting means at a third data rate $f_3$; and (vi) exchanging a second video display signal corresponding to said data segments with said second data channel buffer via second data channel video signal converting means at a fourth data rate $f_4$; wherein (vii) $(f_1 \times dr_1) \geq f_3$, $(f_2 \times dr_2) \geq f_4$ and $(dr_1 + dr_2) \leq 1$ such that said first data channel buffer and said second data channel buffer can sequentially exchange data segments with said storage means via said single data access channel whilst providing continuous data exchange with said first video signal and said second video signal.

The above, and other objects, features and advantages of this invention will be apparent from the following detailed description of illustrative embodiments which is to be read in connection with the accompanying drawings.

DESCRIPTION OF THE PREFERRED EMBODIMENTS

Figure 1:
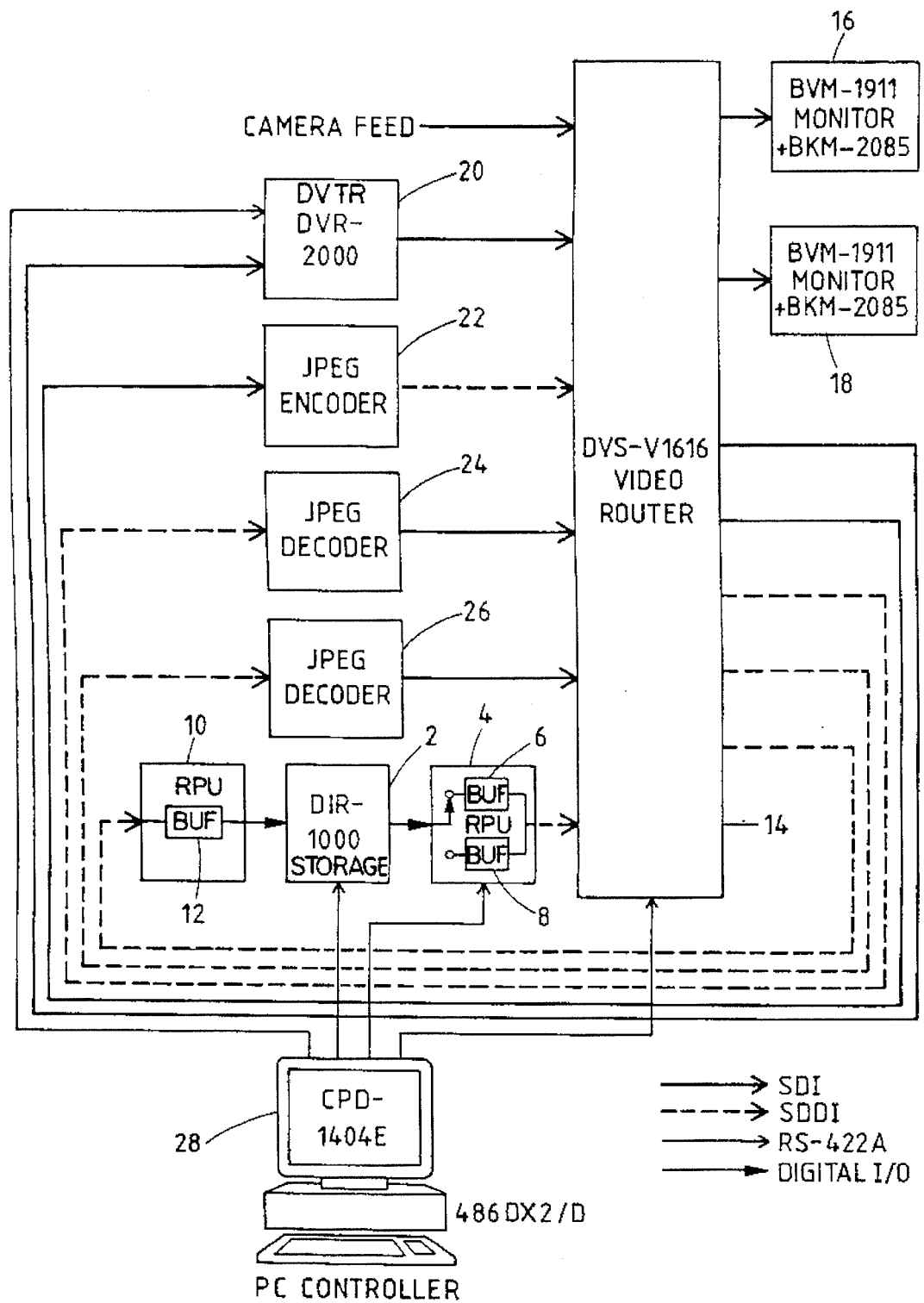
FIG. 1 shows a system having a single storage device with multiple video channels.

FIG. 1 shows a system having a Sony DIR-1000 data recorder 2 serving as the storage means. This data recorder 2 uses digital magnetic tape as its storage medium, but it will be appreciated that other forms of digital data storage such as optical discs or random access memory may be employed.

The data recorder 2 stores data in a form conforming to the ANSI X3.175-19990 ID-1 format. In this format there are four helical scans per track set and each track set is identified by a unique track set ID (address). A track set or a group of track sets may be considered to form a data segment in terms as discussed above.

The digital output of the data recorder 2 is fed to a reproduction processing unit 4. The reproduction processing unit 4 contains a first data channel buffer 6 and a second data channel buffer 8. These data channel buffers 6, 8 are disposed in a configuration so that either may be selected for burst loading from the data recorder 2 whilst both are continuously used as a source for output data.

A recording processing unit 10 is provided at the input to the data recorder 2 and contains a further recording data channel buffer 12. In the particular configuration shown, the first data channel buffer 6 and the second data channel buffer 8 are used exclusively for reproduction, whereas the recording data channel buffer 12 within the recording processing unit 10 is used exclusively for recording. It will be appreciated that the data channel buffers 6, 8, 12 could, by appropriate switching, each be made to serve both of the functions of recording or reproducing if desired (i.e. by connecting the input of the data recorder 2 to either of the first and second data channel buffers 6, 8 within the reproduction processing unit 4, these buffers could serve to enable multichannel operation during recording). The configuration of buffers shown in the example embodiment of FIG. 1 allows either two channels of reproduced data or one channel of reproduced data and one channel of recorded data, but not two simultaneous channels of recorded data.

The output from the reproduction processing unit 4 is connected to a serial data video router 14 (Sony DVS-V1616). The video router 14 can selectively pass data input to it on any of its six inputs to any of its seven outputs.

In the configuration shown, video monitors 16, 18 are connected to two of the outputs of the video router 14 and serve to receive and decode digital video signals input thereto. These digital video signals are supplied at a fixed data rate needed to generate the appropriate field/frame frequency on the monitors 16, 18.

The other outputs from the video router 14 are fed respectively to a digital video tape recorder 20 of the D-2 format, a JPEG encoder 22, two JPEG decoders 24, 26 and the recording processing unit 10. A camera feed is also supplied to the video router 14. The use of JPEG compression assists in allowing the data for generating the video channels to be recoverable from the data recorder 2 faster than it is needed, thereby allowing multiple channels to be supported. If the data recorder had a sufficient data transfer rate then compression may not be needed.

As indicated in FIG. 1, the data formats used over the different connections shown are not the same. More particularly, the video data is stored on the data recorder 2 in a compressed JPEG format and so the data output from the reproducing processing unit 4 has a serial transmission version of this format. In addition, the output from the JPEG encoder 22, the inputs to the recording processing unit 10 and the JPEG decoders 24, 26 will all also have this format.

The other outputs from the video router 14, the inputs to the video router 14 from the JPEG decoders 24, 26 and the camera feed all have the 270Mb/s Serial Digital Interface (SDI) format, which conforms to SMPTE 259M. The compressed JPEG serial data format is based upon the SDI format with the compressed JPEG data being placed in eight bits of each 10-bit serial data word with the remaining bit being set to values that ensure the control words for the serial format do not inadvertently appear within the compressed data stream. In the compressed JPEG serial data the information to generate more than one image appears within a single frame of the SDI format.

A personal computer 28 is connected via an RS-422A link to the video router 14, the reproducing processing unit 4, the data recorder 2 and the D-2 video tape recorder 20. The personal computer 28 uses these links to pass digital command instructions to these respective items to control their operation. In particular, the video router 14 is controlled to select appropriate interconnections between the inputs and outputs of the video router. The recording processing unit 10 is controlled to select which of the first and second data channel buffers 6, 8 is currently being filled/emptied.

Figure 2:
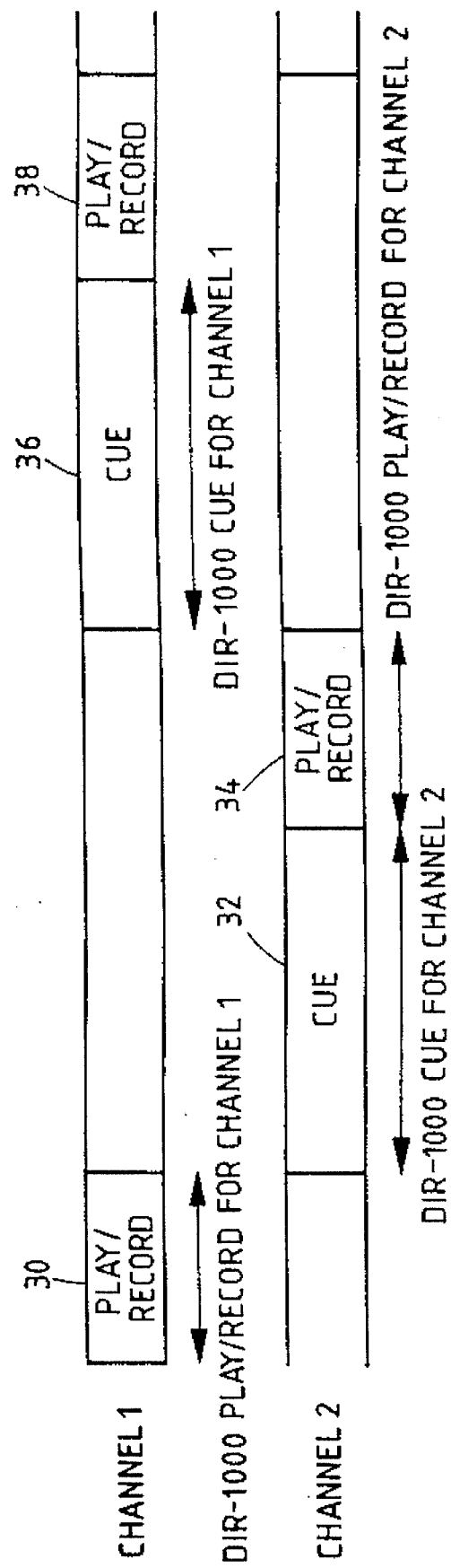
FIG. 2 illustrates the operation of the storage device of FIG. 1.

FIG. 2 illustrates the operation of the data recorder 2. During a first period 30 the data recorder 2 reproduces data at a first data rate $f_1$ and this is stored in the first data channel buffer 6. After this reproduction operation, the data recorder 2 enters a cue operation 32 to advance or rewind the magnetic tape to the start of the next data segment channel 2. After this cue operation 32, a reproducing operation 34 into the second data channel buffer 8 takes place. The system then enters another cue operation 36 to find the data segment for channel 1 to follow that reproduced in the operation 30. When this next data segment has been found it is reproduced into the first data channel buffer 6 during a further reproducing operation 38.

In this way, successive data segments for each channel are sequentially accessed via the single access channel of the data recorder 2.

Looking at the operation illustrated in FIG. 2 in another manner it will be seen that it illustrates two channel replay. The personal computer 28 serves to set a start track set ID (address) for each channel. The data recorder 2 then cues to the first track set ID and replays n seconds of compressed video data from that track set into the first data channel buffer 6 at the off tape data rate $f_1$. The data recorder 2 now has some time to search for and cue to the second track set ID and once located replay n seconds of compressed video data from that location into the second data channel buffer 8 at the off tape data rate $f_2$. The overall cycle time (2×(play+cue)) is the duration of the real time video sequence reproduced. Compressed video data is read from the respective first and second data channel buffers 6, 8 to the JPEG decoders 24, 26 via the video router 14 at the rate of one compressed video frame of data per real time frame of data (i.e. at respective third and fourth data rates $f_3$ $f_4$ in terms of the terminology used above).

It will also be seen from FIG. 2 that one of the two replay segments could be a record segment if so desired. This would allow simultaneous record and replay from a single storage medium.

The task of providing such multi channel access from a single storage media is eased if a high compression ratio is used for the video data so allowing a longer duration of video signal to be generated from a given amount of data reproduced from the media. Furthermore, as the number of channels it is desired to operate and the search cue and access time of the system increase then it becomes more difficult to complete the necessary search and cue actions between the record/replay operations to the tape.

Figure 3:
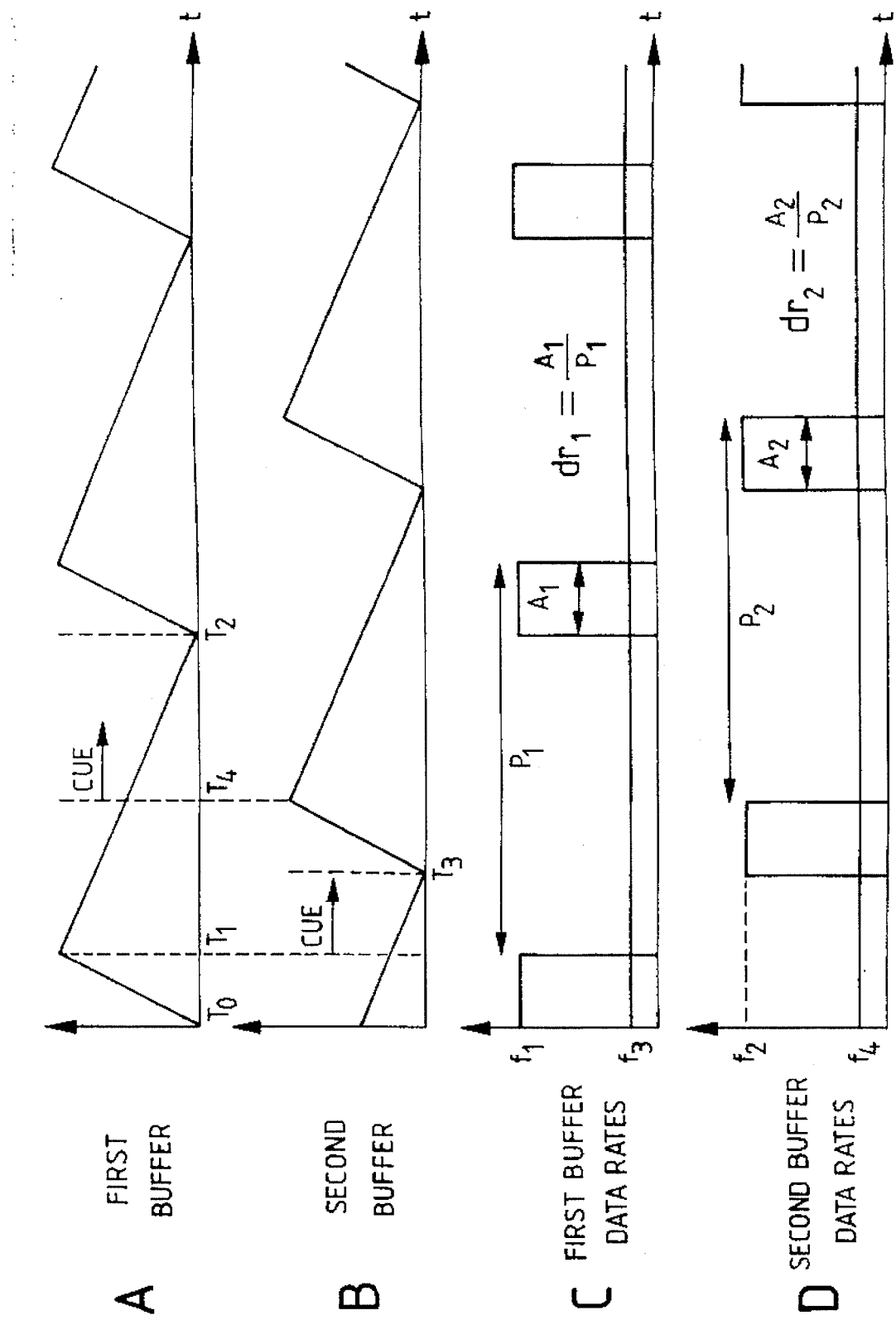
FIG. 3 shows graphs illustrating the operation of the system of FIG. 1.

FIG. 3 illustrates the loading and unloading of data into the first and second data channel buffers 6, 8 during the simultaneous reproduction of two channels and the data rates of exchange of data with these buffers throughout the operation. Graph A shows the contents of the first buffer against time (the contents of the first buffer never in fact reach zero, there always being some data pending output). From time $T_0$ to $T_1$, the first data channel buffer 6 is loaded with data from the data recorder 2 at the first data rate $f_1$ as shown in Graph C. Between time $T_1$ and $T_2$ no further data is loaded into the first data channel buffer 6. Throughout the period $T_0$ to $T_2$ data is read from the first data channel buffer 6 at the third data rate $f_3$. Subsequent to time $T_2$ the cycle of reloading and reading from the first data channel, buffer 6 repeats.

Graph C shows the periodic nature of the loading of the first data channel buffer 6. The period of this operation is $P_1$. The duration of the active period during which loading of the first data channel buffer 6 takes place is $A_1$. Accordingly, the average duty ratio for the data exchange at the first data rate $f_1$ is given by $dr_1=A_1/P_1$.

Following time T1, the data recorder 2 enters a cue operation to find the data segment for the second channel that must next be loaded into the second data channel buffer 8. This cue operation is completed prior to time $T_3$ at which the data exchange at the data rate $f_2$ commences as illustrated in Graph D. At time $T_4$, this data exchange with the second data channel buffer 8 is completed and the cue operation back to the next data segment for the first channel can be commenced and completed before time $T_2$. The reading of data from the second data channel buffer 8 continuously takes place at the fourth data rate $f_4$ as illustrated in Graph D. In an analogous manner to the above, the average duty ratio for the data exchange at the second data rate $f_2$ is given by $dr_2=A_2/P_2$.

It will be appreciated that in the embodiment shown in FIG. 1, $f_1=f_2$ and $f_3=f_4$, but that this need not necessarily be the case, e.g. the video monitors 16, 18 could be of different resolutions requiring different input data rates.

Although illustrative embodiments of the invention have been described in detail herein with reference to the accompanying drawings, it is to be understood that the invention is not limited to those precise embodiments, and that various changes and modifications can be effected therein by one skilled in the aft without departing from the scope and spirit of the invention as defined by the appended claims.

We claim:

1. Apparatus for storing video data, said apparatus comprising:

(i) storage means for storing video data as a plurality of addressable data segments accessible via a single data access channel;

(ii) address generating means for generating addresses of said data segments to be accessed within said storage means;

(iii) a first data channel buffer for exchanging a first plurality of said data segments with said storage means via said single data access channel at a first data rate $f_1$ with an average first duty ratio $dr_1$ under control of said address generating means;

(iv) a second data channel buffer for exchanging a second plurality of said data segments with said storage means via said single data access channel at a second data rate $f_2$ with an average second duty ratio $dr_2$ under control of said address generating means;

(v) a first data channel video signal converting means for exchanging a first video display signal corresponding to said first plurality of data segments with said first data channel buffer at a third data rate $f_3$; and (vi) a second data channel video signal converting means for exchanging a second video display signal corresponding to said second plurality of data segments with said second data channel buffer at a fourth data rate $f_4$; wherein (vii) $(f_1 \times dr_1) \geq f_3$, $(f_2 \times dr_2) \geq f_4$ and $(dr_1 + dr_2) \leq 1$ such that said first data channel buffer and said second data channel buffer can sequentially exchange the first and second pluralities of data segments, respectively, with said storage means via said single data access channel whilst providing continuous data exchange with said first data channel video signal converting means and said second data channel video signal converting means, respectively.

2. Apparatus as claimed in claim 1, comprising a third data channel buffer for exchanging a third plurality of said data segments with said storage means.

3. Apparatus as claimed in claim 1, wherein said first video signal is reproduced from said storage means via said single data access channel and said first data channel buffer.

4. Apparatus as claimed in claim 1, wherein said first video signal is recorded on said storage means via said first data channel buffer and said single data access channel.

5. Apparatus as claimed in claim 1, wherein said second video signal is reproduced from said storage means via said single data access channel and said second data channel buffer.

6. Apparatus as claimed in claim 1, wherein said second video signal is recorded on said storage means via said second data channel buffer and said single data access channel.

7. Apparatus as claimed in claim 1, wherein said first plurality of data segments comprises a plurality of compressed video data and said first data channel video signal converting means comprises a first data decompressor for decompressing said plurality of compressed video data to form said first video signal at said third data rate $f_3$, said third data rate $f_3$ being fixed to yield a constant video field/frame rate.

8. Apparatus as claimed in claim 7, wherein said plurality of compressed video data comprises JPEG compressed video data and said first data decompressor comprises a JPEG decoder.

9. Apparatus as claimed in claim 1, wherein said second plurality of data segments comprises a plurality of compressed video data and said second data channel video signal converting means comprises a second data decompressor for decompressing said pluralty of compressed video data to form said second video signal at said fourth data rate $f_4$, said fourth data rate $f_4$ being fixed to yield a constant video field/frame rate.

10. Apparatus as claimed in claim 9, wherein said plurality of compressed video data comprises JPEG compressed video data and said second data decompressor comprises a JPEG decoder.

11. Apparatus as claimed in claim 1, wherein said storage means comprises a single storage media.

12. Apparatus as claimed in claim 11, wherein said storage media comprises one of:

a magnetic tape;

a magnetic disc;

an optical disc; and a solid state memory.

13. Apparatus as claimed in claim 2, wherein said third plurality of data segments exchanged via said third data channel buffer corresponds to data other than video data.

14. Apparatus as claimed in claim 1, wherein said storage means, said first data channel buffer, said second data channel buffer, said first data channel video signal converting means and said second data channel video signal converting means are interconnected by serial data links via a digital router.

15. A method of storing video data, said method comprising the steps of:

(i) storing video data as a plurality of addressable data segments accessible via a single data access channel of a storage means;

(ii) generating addresses of said data segments to be accessed within said storage means with address generating means;

(iii) exchanging a first plurality of said data segments between a first data channel buffer and said storage means via said single data access channel at a first data rate $f_1$ with an average first duty ratio $dr_1$ under control of said address generating means;

(iv) exchanging a second plurality of data segments between a second data channel buffer and said storage means via said single data access channel at a second data rate $f_2$ with an average second duty ratio $dr_2$ under control of said address generating means;

(v) exchanging a first video display signal corresponding to said first plurality of data segments with said first data channel buffer via a first data channel video signal converting means at a third data rate $f_3$; and (vi) exchanging a second video display signal corresponding to said second plurality of data segments with said second data channel buffer via a second data channel video signal converting means at a fourth data rate $f_4$; wherein (vii) $(f_1 \times dr_1) \geq f_3$, $(f_2 \times dr_2) \geq f_4$ and $(dr_1 + dr_2) \leq 1$ such that said first data channel buffer and said second data channel buffer can sequentially exchange the first and second pluralities of data segments, respectively, with said storage means via said single data access channel whilst providing continuous data exchange with said first data channel video signal converting means and said second data channel video signal converting means, respectively.

* * * * *